US010233298B2

(12) United States Patent
Klesczewski et al.

(10) Patent No.: US 10,233,298 B2
(45) Date of Patent: Mar. 19, 2019

(54) POLYURETHANE FOAMS BASED ON POLYETHER CARBONATE POLYOLS

(71) Applicant: Covestro Deutschland AG, Leverkusen (DE)

(72) Inventors: Bert Klesczewski, Köln (DE); Kai Laemmerhold, Aachen (DE); Jörg Hofmann, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/306,182

(22) PCT Filed: Apr. 21, 2015

(86) PCT No.: PCT/EP2015/058589
§ 371 (c)(1),
(2) Date: Oct. 24, 2016

(87) PCT Pub. No.: WO2015/162125
PCT Pub. Date: Oct. 29, 2015

(65) Prior Publication Data
US 2017/0044341 A1 Feb. 16, 2017

(30) Foreign Application Priority Data

Apr. 24, 2014 (EP) .................. 14165730
Aug. 29, 2014 (EP) .................. 14182769

(51) Int. Cl.
C08G 18/44 (2006.01)
C08G 18/48 (2006.01)
C08G 18/76 (2006.01)
C08J 9/00 (2006.01)
C08K 5/00 (2006.01)
C08K 5/18 (2006.01)
C08K 5/134 (2006.01)
C08K 5/5317 (2006.01)
C08G 101/00 (2006.01)

(52) U.S. Cl.
CPC ............ C08J 9/0023 (2013.01); C08G 18/44 (2013.01); C08G 18/48 (2013.01); C08G 18/4837 (2013.01); C08G 18/7621 (2013.01); C08J 9/0028 (2013.01); C08K 5/005 (2013.01); C08K 5/134 (2013.01); C08K 5/18 (2013.01); C08K 5/5317 (2013.01); C08G 2101/0008 (2013.01); C08G 2101/0083 (2013.01); C08J 2205/06 (2013.01); C08J 2375/08 (2013.01)

(58) Field of Classification Search
CPC .................................................. C08G 18/44
See application file for complete search history.

(56) References Cited

U.S. PATENT DOCUMENTS 3,404,109 A 10/1968 Milgrom
3,829,505 A 8/1974 Herold
3,941,849 A 3/1976 Herold
4,248,930 A 2/1981 Haas et al.
4,263,408 A 4/1981 Meyborg et al.
4,444,676 A 4/1984 Statton et al.
4,644,017 A 2/1987 Haas et al.
5,158,922 A 10/1992 Hinney et al.
5,470,813 A 11/1995 Le-Khac
5,869,565 A 2/1999 Clauss
6,348,514 B1 * 2/2002 Calabrese ............ C08G 18/284
521/113
6,410,638 B1 6/2002 Kaufhold et al.
6,767,986 B2 7/2004 Moethrath et al.
7,008,900 B1 3/2006 Hofmann et al.
8,247,467 B2 8/2012 Mijolovic et al.
8,324,419 B2 12/2012 Mijolovic et al.
2001/0044518 A1 11/2001 Hoffmann et al.
2002/0040978 A1 4/2002 Narayan et al.

FOREIGN PATENT DOCUMENTS

| DE | 19618786 A1 | 11/1996 |
| EP | 0000389 A1 | 1/1979 |
| EP | 0007502 A1 | 2/1980 |
| EP | 0176013 A2 | 4/1986 |
| EP | 0222453 A2 | 5/1987 |
| EP | 700 949 A2 | 3/1996 |
| EP | 743093 A1 | 11/1996 |
| EP | 761708 A2 | 3/1997 |
| EP | 905180 A2 | 3/1999 |
| EP | 1050549 A2 | 11/2000 |
| EP | 1359177 A1 | 11/2003 |
| EP | 1874853 A2 | 1/2008 |
| EP | 2115032 A1 | 11/2009 |
| WO | WO-9740086 A1 | 10/1997 |
| WO | WO-9816310 A1 | 4/1998 |
| WO | WO-0047649 A1 | 8/2000 |
| WO | WO-2006111492 A2 | 10/2006 |
| WO | WO-2008013731 A1 | 1/2008 |
| WO | WO-2008058913 A1 | 5/2008 |
| WO | WO-2008092767 A1 | 8/2008 |
| WO | WO-2009016073 A1 | 2/2009 |

OTHER PUBLICATIONS

International Search Report for PCT/EP2015/058589 dated Jun. 30, 2015.
Irgastab PUR 68, MSDS No. C5586350 (Version 2); Ciba Specialty Chemicals: Thomastown, Victoria, Australia, Jul. 26, 2003.
Klemchuk, P., "Antioxidants", Ullmann's Encyclopedia of Industrial Chemistry, Wiley-VCH Verlag GmbH & Co. KGaA: Weinheim, 2012; vol. 4, pp. 157-178.

* cited by examiner

Primary Examiner — Melissa A Rioja
(74) Attorney, Agent, or Firm — Drinker Biddle & Reath LLP

(57) ABSTRACT

The present invention concerns a method for producing polyurethane foams by reacting an isocyanate component with a component that is reactive to isocyanates and that comprises at least one polyether carbonate polyol, the reaction taking place in the presence of a non-amine antioxidant and an amine antioxidant. The invention also concerns polyurethane foams produced using the claimed method and the use of said foams.

14 Claims, No Drawings

POLYURETHANE FOAMS BASED ON POLYETHER CARBONATE POLYOLS

CROSS-REFERENCE TO RELATED APPLICATIONS

This application is a national stage application (under 35 U.S.C. § 371) of PCT/EP2015/058589, filed Apr. 21, 2015, which claims benefit of European Application Nos. 14165730.4, filed Apr. 24, 2014, and 14182769.1, filed Aug. 29, 2014, all of which are incorporated herein by reference in their entirety.

The present invention relates to a process for producing polyurethane foams, preferably flexible polyurethane foams, by reaction of an isocyanate component with an isocyanate-reactive component which comprises at least one polyether carbonate polyol and wherein the reaction is effected in the presence of a nonaminic antioxidant and an aminic antioxidant. The invention further relates to polyurethane foams produced by the process according to the invention and to the use thereof.

BACKGROUND OF THE INVENTION

WO-A 2008/058913 describes the production of flexible polyurethane foams from polyether carbonate polyols using amine-free stabilizers against thermooxidative degradation, i.e. amine-free antioxidants such as sterically hindered phenols, lactones and amine-free antioxidants which do not eliminate phenol and any desired mixtures of these compounds. The combination of amine-free and aminic antioxidants is not disclosed.

In the context of an environmentally friendly design of production processes, it is generally desirable to use $CO_2$-based starting materials in relatively large amounts. In the production of the polyurethane foams, said foams have a propensity for thermooxidative degradation. The present invention accordingly has for its object the provision of a process for producing polyurethane foams which comprise a high proportion of polyether carbonate polyols, wherein the resulting polyurethane foams are protected against thermooxidative degradation.

Surprisingly, this object was achieved by a process for producing polyurethane foams in which the reaction of an isocyanate component B with an isocyanate-reactive component A which comprises at least one polyether carbonate polyol is effected in the presence of a nonaminic antioxidant and an aminic antioxidant.

BRIEF SUMMARY OF THE INVENTION

The invention accordingly provides a process for producing polyurethane foams, preferably flexible polyurethane foams, by reaction of component A comprising A1 $\geq 50$ to $\leq 100$ parts by wt, preferably $\geq 70$ to $\leq 100$ parts by wt, particularly preferably $\geq 80$ to $\leq 100$ parts by wt of a polyether carbonate polyol having a hydroxyl number according to DIN 53240 of $\geq 20$ mg KOH/g to $\leq 250$ mg KOH/g, preferably of $\geq 20$ mg KOH/g to $\leq 150$ mg KOH/g, particularly preferably of $\geq 25$ mg KOH/g to $\leq 90$ mg KOH/g, A2 $\leq 50$ to $\geq 0$ parts by wt, preferably from $\leq 30$ to $\geq 0$ parts by wt, particularly preferably from $\leq 20$ to $\geq 0$ parts by wt, of a polyether polyol having a hydroxyl number according to DIN 53240 of $\geq 20$ mg KOH/g to $\leq 250$ mg KOH/g, preferably of $\geq 20$ to $\leq 112$ mg KOH/g and particularly preferably $\geq 20$ mg KOH/g to $\leq 80$ mg KOH/g, wherein the polyether polyol A2 is free from carbonate units, A3 0.5 to 25 parts by wt, preferably 1.0 to 15 parts by wt, particularly preferably 1.5 to 10 parts by wt, based on the sum of the parts by wt of components A1 and A2 of water and/or physical blowing agents, A4.1 0.02-3.0 parts by wt, preferably 0.04-2.0 parts by wt, particularly preferably 0.05-1.5 parts by wt, based on the sum of the parts by wt of components A1 and A2 of an antioxidant free from amino groups, preferably a phenolic antioxidant and A4.2 0.02-3.0 parts by wt, preferably 0.04-2.0 parts by wt, particularly preferably 0.05-1.5 parts by wt, based on the sum of the parts by wt of components A1 and A2 of an antioxidant which comprises at least one compound having one or more amino groups, A5 0.1 to 8.1 parts by wt, preferably 0.1 to 7.5 parts by wt, particularly preferably 0.15 to −7.0 parts by wt, based on the sum of the parts by wt of components A1 and A2 of auxiliary and added substances, with component B comprising di- and/or polyisocyanates, wherein production is effected at an index of 70 to 130, preferably of 85 to 125, particularly preferably of 90 to 120 and wherein all reported parts by weight for components A1 to A5 are normalized such that the sum of the parts by weight A1+A2 in the composition amounts to 100.

It is now been found that the polyurethane foams produced in accordance with the process of the invention are protected against thermooxidative degradation. This thermooxidative degradation may be determined for example by subjecting the polyurethane formulation to a microwave treatment after foaming, and subsequently determining the yellowness index. The yellowness index after this microwave treatment allows conclusions to be drawn about thermooxidative degradation and thus about stabilization of the polyurethane foam formulation. A low yellowness index shows that the polyurethane formulation is stabilized against thermooxidative degradation.

To produce the polyurethane foams, the reaction components are reacted by the one-step process known per se, often using mechanical means, for example those described in EP-A 355 000. Details of processing means also contemplated in accordance with the invention are reported in Kunststoff-Handbuch, volume VII, edited by Vieweg and Höchtlen, Carl-Hanser-Verlag, Munich 1993, for example on pages 139 to 265.

The polyurethane foams are preferably in the form of flexible polyurethane foams and may be produced as molded foams or else as slabstock foams, preferably as slabstock foams. The invention therefore provides a process for producing the polyurethane foams, the polyurethane foams produced by these processes, the flexible slabstock polyurethane foams/flexible molded polyurethane foams produced by these processes, the use of the flexible polyurethane foams for production of moldings, and the moldings themselves.

The components employed in the process according to the invention are more particularly described hereinbelow.

DETAILED DESCRIPTION OF THE INVENTION

Component A1

Component A1 comprises a polyether carbonate polyol having a hydroxyl number (OH number) as per DIN 53240 of ≥20 mg KOH/g to ≤250 mg KOH/g, preferably of ≥20 mg KOH/g to ≤150 mg KOH/g, particularly preferably of ≥25 mg KOH/g to ≤90 mg KOH/g, which is obtainable by copolymerization of ≥2 wt % to ≤30 wt % of carbon dioxide and ≥70 wt % to ≤98 wt % of one or more alkylene oxides, in the presence of one or more H-functional starter molecules having an average functionality of ≥1 to ≤6, preferably of ≥1 and ≤4, particularly preferably ≥2 and ≤3. "H-functional" is to be understood in the context of the invention as meaning a starter compound having alkoxylation-active H atoms.

The copolymerization of carbon dioxide and one or more alkylene oxides is preferably effected in the presence of at least one DMC catalyst (double metal cyanide catalyst).

The polyether carbonate polyols used in accordance with the invention preferably also have ether groups between the carbonate groups, shown schematically in formula (IX). In the scheme according to formula (IX), R represents an organic radical such as alkyl, alkylaryl or aryl, each of which may also comprise heteroatoms, for example O, S, Si, etc.; e and f are integers. The polyether carbonate polyol shown in the scheme according to formula (IX) is to be understood as meaning merely that blocks having the structure shown may in principle be present in the polyether carbonate polyol, while the sequence, number and length of the blocks may vary and is not limited to the polyether carbonate polyol shown in formula (IX). In terms of formula (IX) this means that the e/f ratio is preferably from 2:1 to 1:20, more preferably from 1.5:1 to 1: 10.

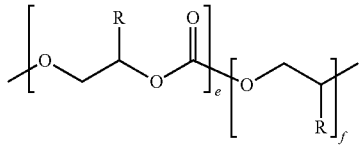

(IX)

The proportion of incorporated $CO_2$ ("units originating from carbon dioxide") in a polyether carbonate polyol can be determined from the evaluation of characteristic signals in the $^1$H NMR spectrum. The example which follows illustrates the determination of the proportion of units originating from carbon dioxide in an octane-1,8-diol-started $CO_2$/propylene oxide polyether carbonate polyol.

The proportion of $CO_2$ incorporated in a polyether carbonate polyol and the ratio of propylene carbonate to polyether carbonate polyol can be determined by $^1$H NMR (a suitable instrument is from Bruker, DPX 400, 400 MHz; zg30 pulse program, delay time d1: 10 s, 64 scans). Each sample is dissolved in deuterated chloroform. The relevant resonances in the $^1$H NMR (based on TMS=0 ppm) are as follows:

Cyclic carbonate (which was formed as a by-product) having a resonance at 4.5 ppm; carbonate resulting from carbon dioxide incorporated in the polyether carbonate polyol having resonances at 5.1 to 4.8 ppm; unreacted propylene oxide (PO) having a resonance at 2.4 ppm; polyether polyol (i.e. without incorporated carbon dioxide) having resonances at 1.2 to 1.0 ppm; the octane-1,8-diol incorporated as starter molecule (if present) having a resonance at 1.6 to 1.52 ppm.

The mole fraction of the carbonate incorporated in the polymer in the reaction mixture is calculated by formula (I) as follows, the following abbreviations being used:

A(4.5)=area of the resonance at 4.5 ppm for cyclic carbonate (corresponds to an H atom)
A(5.1-4.8)=area of the resonance at 5.1-4.8 ppm for polyethercarbonate polyol and an H atom for cyclic carbonate
A(2.4)=area of the resonance at 2.4 ppm for free, unreacted PO
A(1.2-1.0)=area of the resonance at 1.2-1.0 ppm for polyether polyol
A(1.6-1.52)=area of the resonance at 1.6 to 1.52 ppm for octane-1,8-diol (starter), if present Taking account of the relative intensities, the values for the polymer-bound carbonate ("linear carbonate" LC) in the reaction mixture were converted to mol % by the following formula (I):

$$LC = \frac{A(5.1-4.8) - A(4.5)}{A(5.1-4.8) + A(2.4) + 0.33*A(1.2-1.0) + 0.25*A(1.6-1.52)} * 100 \quad (I)$$

The weight fraction (in wt %) of polymer-bound carbonate (LC') in the reaction mixture was calculated by formula (II)

$$LC' = \frac{[A(5.1-4.8) - A(4.5)]*102}{N} * 100\% \quad (II)$$

wherein the value of N ("denominator" N) is calculated by formula (III):

$$N=[A(5.1-4.8)-A(4.5)]*102+A(4.5)*102+A(2.4)*58+ \\ 0.33*A(1.2-1.0)*58+0.25*A(1.6-1.52)*146 \quad (III)$$

The factor 102 results from the sum of the molar masses of $CO_2$ (molar mass 44 g/mol) and of propylene oxide (molar mass 58 g/mol), the factor 58 results from the molar mass of propylene oxide, and the factor 146 results from the molar mass of the octane-1,8-diol starter used (if present).

The weight fraction (in wt %) of cyclic carbonate (CC') in the reaction mixture was calculated by formula (IV):

$$CC' = \frac{A(4.5)*102}{N} * 100\% \quad (IV)$$

where the value of N is calculated by formula (III).

In order to calculate the composition based on the polymer fraction (composed of polyether polyol constructed from starter and propylene oxide during the activation steps which take place under $CO_2$-free conditions, and polyether carbonate polyol constructed from starter, propylene oxide and carbon dioxide during the activation steps which take place in the presence of $CO_2$ and during the copolymerization) from the values for the composition of the reaction mixture, the nonpolymeric constituents of the reaction mixture (i.e. cyclic propylene carbonate and any unconverted propylene oxide present) were mathematically eliminated. The weight fraction of the carbonate repeat units in the polyether carbonate polyol was converted to a weight fraction of carbon dioxide using the factor F=44/(44+58). The value for the $CO_2$ content in the polyether carbonate polyol is normalized to the proportion of the polyether carbonate polyol molecule which was formed in the copolymerization and any activation steps in the presence of $CO_2$ (i.e. the proportion of the polyether carbonate polyol molecule resulting from the starter (octane-1,8-diol, if present) and from the reaction of the starter with epoxide added under $CO_2$-free conditions was not taken into account here).

For example, the production of polyether carbonate polyols according to A1 comprises by:

(α) initially charging an H-functional starter substance or a mixture of at least two H-functional starter substances and removing any water and/or other volatile compounds through elevated temperature and/or reduced pressure ("drying"), wherein the DMC catalyst is added to the H-functional starter substance or to the mixture of at least two H-functional starter substances before or after drying, (β) activating by adding a portion (based on the total amount of alkylene oxides used in the activation and copolymerization) of one or more alkylene oxides to the mixture resulting from step (α), wherein this addition of a portion of alkylene oxide may optionally be effected in the presence of $CO_2$ and wherein the hotspot, which occurs due to the subsequent exothermic chemical reaction, and/or a pressure drop in the reactor is then awaited in each case and wherein activation step (β) may also be effected repeatedly, (γ) adding one or more of the alkylene oxides and carbon dioxide to the mixture resulting from step (β), wherein the alkylene oxides employed in step (β) may be identical or different to the alkylene oxides employed in step (γ), Production of the polyether carbonate polyols A1 may generally be achieved using alkylene oxides (epoxides) having 2 to 24 carbon atoms. The alkylene oxides having 2 to 24 carbon atoms are for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The alkylene oxides employed are preferably ethylene oxide and/or propylene oxide and/or 1,2-butylene oxide, particularly preferably propylene oxide.

In a preferred embodiment of the invention the proportion of ethylene oxide in the altogether employed amount of propylene oxide and ethylene oxide is ≥0 and ≤90 wt %, preferably ≥0 and ≤50 wt % and particularly preferably free from ethylene oxide.

Suitable H-functional starter substances that may be employed are compounds having alkoxylation-active H atoms. Alkoxylation-active groups having active H atoms are for example —OH, —$NH_2$ (primary amines), —NH— (secondary amines), —SH and —$CO_2H$, preference being given to —OH and —$NH_2$, particular preference being given to —OH, H-functional starter substances employed are for example one or more compounds selected from the group consisting of water, mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example so-called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, mono- or diglyceride of ricinoleic acid, monoglycerides of fatty acids, chemically modified mono-, di- and/or triglycerides of fatty acids, and $C_1$-$C_{24}$-alkyl fatty acid esters comprising on average at least 2 OH groups per molecule. The $C_1$-$C_{24}$ alkyl fatty acid esters comprising on average at least 2 OH groups per molecule are for example commercially available products such as Lupranol Balance® (BASF AG), the Merginol® range (Hobum Oleochemicals GmbH), the Sovermol® range (Cognis Deutschland GmbH & Co. KG) and the Soyol® TM range (USSC Co.).

Monofunctional starter compounds that may be employed are alcohols, amines, thiols and carboxylic acids. Monofunctional alcohols that may be employed are: methanol, ethanol, 1-propanol, 2-propanol, 1-butanol, 2-butanol, t-butanol, 3-buten-1-ol, 3-butyn-1-ol, 2-methyl-3-buten-2-ol, 2-methyl-3-butyn-2-ol, propargyl alcohol, 2-methyl-2-propanol, 1-t-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Contemplated monofunctional amines are: butylamine, t-butylamine, pentylamine, hexylamine, aniline, aziridine, pyrrolidine, piperidine, morpholine. Monofunctional thiols that may be employed are: ethanethiol, 1-propanethiol, 2-propanethiol, 1-butanethiol, 3-methyl-1-butanethiol, 2-butene-1-thiol, thiophenol. Monofunctional carboxylic acids that may be mentioned are: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are for example dihydric alcohols (for example ethylene glycol, diethylene glycol, propylene glycol, dipropylene glycol, propane-1,3-diol, butane-1,4-diol, butene-1, 4-diol, butyne-1,4-diol, neopentyl glycol, pentantane-1,5-diol, methylpentanediols (for example 3-methylpentane-1, 5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these abovementioned alcohols with different amounts of ε-caprolactone. In mixtures of H-functional starters trihydric alcohols, for example trimethylolpropane, glycerol, trishydroxyethyl isocyanurate and castor oil, may also be employed.

The H-functional starter substances may also be selected from the substance class of the polyether polyols, in particular those having a molecular weight M in the range from 100 to 4000 g/mol, preferably 250 to 2000 g/mol. Preference is given to polyether polyols formed from repeating ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols formed from repeating propylene oxide and/or ethylene oxide units are for example the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E brands from BASF SE, suitable homopolypropylene oxides are for example the Pluriol® P brands from BASF SE; suitable mixed copolymers of ethylene oxide and propylene oxide are for example the Pluronic® PE or Pluriol® RPE brands from BASF SE.

The H-functional starter substances may also be selected from the substance class of the polyester polyols, in particular those having a molecular weight $M_n$ in the range from 200 to 4500 g/mol, preferably 400 to 2500 g/mol. The polyester polyols employed are at least difunctional polyesters. Polyester polyols preferably consist of alternating acid and alcohol units. Acid components employed are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols. If polyether polyols are used to prepare the polyester ether polyols, preference is given to polyether polyols having a number-average molecular weight $M_n$ of 150 to 2000 g/mol.

The H-functional starter substances employed may additionally be polycarbonate polyols (for example polycarbonate diols), in particular those having a molecular weight $M_n$ in the range from 150 to 4500 g/mol, preferably 500 to 2500, which are produced for example by reaction of phosgene, dimethyl carbonate, diethyl carbonate or diphenyl carbonate and di- and/or polyfunctional alcohols or polyester polyols or polyether polyols. Examples of polycarbonate polyols may be found in EP-A 1359177 for example. Examples of polycarbonate diols that may be used include the Desmophen® C range from Bayer MaterialScience AG, for example Desmophen® C 1100 or Desmophen® C 2200.

Polyether carbonate polyols may likewise be used as H-functional starter substances. Polyether carbonate polyols produced by the above-described process are used in particular. To this end these polyether carbonate polyols used as H-functional starter substances are produced beforehand in a separate reaction step.

Preferred H-functional starter substances are alcohols of general formula (V)

$$HO—(CH_2)_x—OH \qquad (V)$$

wherein x is a number from 1 to 20, preferably an even number from 2 to 20. Examples of alcohols of formula (V) are ethylene glycol, butane-1,4-diol, hexane-1,6-diol, octane-1,8-diol, decane-1,10-diol and dodecane-1,12-diol. Further preferred H-functional starter substances are neopentyl glycol, trimethylolpropane, glycerol, pentaerythritol, reaction products of the alcohols of formula (V) with ε-caprolactone, for example reaction products of trimethylolpropane with ε-caprolactone, reaction products of glycerol with ε-caprolactone and reaction products of pentaerythritol with ε-caprolactone. Also preferably employed as H-functional starter substances are water, diethylene glycol, dipropylene glycol, castor oil, sorbitol and polyether polyols formed from repeat polyalkylene oxide units.

The H-functional starter substances are particularly preferably one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, diethylene glycol, dipropylene glycol, glycerol, trimethylolpropane, di- and trifunctional polyether polyols, where the polyether polyol has been formed from a di- or tri-H-functional starter substance and propylene oxide or a di- or tri-H-functional starter substance, propylene oxide and ethylene oxide. The polyether polyols preferably have a number-average molecular weight $M_n$ in the range from 62 to 4500 g/mol and in particular a number-average molecular weight $M_n$ in the range from 62 to 3000 g/mol, very particularly preferably a molecular weight of 62 to 1500 g/mol. The polyether polyols preferably have a functionality of ≥2 to ≤3.

In a preferred embodiment of the invention the polyether carbonate polyol A1 is obtainable by addition of carbon dioxide and alkylene oxides onto H-functional starter substances using multimetal cyanide catalysts (DMC catalysts). The production of polyether carbonate polyols by addition of alkylene oxides and $CO_2$ onto H-functional starter substances using DMC catalysts is disclosed for example in EP-A 0222453, WO-A 2008/013731 and EP-A 2115032.

DMC catalysts are known in principle from the prior art for homopolymerization of epoxides (see for example U.S. Pat. No. 3,404,109, U.S. Pat. No. 3,829,505, U.S. Pat. No. 3,941,849, and U.S. Pat. No. 5,158,922). DMC catalysts, which are described for example in U.S. Pat. No. 5,470,813, EP-A 700 949, EP-A 743 093, EP-A 761 708, WO-A97/40086, WO-A98/16310 and WO-A00/47649, have a very high activity in the homopolymerization of epoxides and make it possible to produce polyether polyols and/or polyether carbonate polyols at very low catalyst concentrations (25 ppm or less). A typical example are the high-activity DMC catalysts described in EP-A 700 949 which as well as a double metal cyanide compound (e.g., zinc hexacyanocobaltate (III)) and an organic complex ligand (e.g., t-butanol) also comprise a polyether having a number-average molecular weight $M_n$ of greater than 500 g/mol.

The DMC catalyst is usually employed in an amount of ≤1 wt %, preferably in an amount of ≤0.5 wt %, particularly preferably in an amount of ≤500 ppm and in particular in an amount of ≤300 ppm based in each case on the weight of the polyether carbonate polyol.

In a preferred embodiment of the invention the polyether carbonate polyol A) has a content of carbonate groups ("units originating from carbon dioxide"), calculated as $CO_2$, of ≥2.0 and ≤30.0 wt %, preferably of ≥5.0 and ≤28.0 wt % and particularly preferably of ≥10.0 and ≤25.0 wt %.

In a further embodiment of the process of the invention the polyether carbonate polyol(s) according to A1) has/have a hydroxyl number of ≥20 mg KOH/g to ≤250 mg KOH/g and is/are obtainable by copolymerization of ≥2.0 wt % to ≤30.0 wt % of carbon dioxide and ≥70 wt % to ≤98 wt % of propylene oxide in the presence of a hydroxy-functional starter molecule, for example trimethylolpropane and/or glycerol and/or propylene glycol and/or sorbitol. The hydroxyl number may be determined as per DIN 53240.

A further embodiment employs a polyether carbonate polyol A1 comprising blocks according to formula (IX), wherein the e/f ratio is from 2:1 to 1:20.

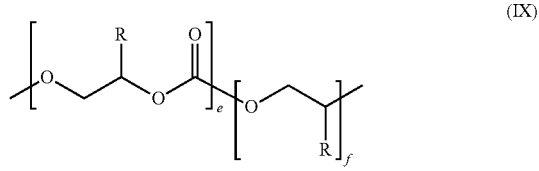

(IX)

A further embodiment of the invention employs component A1 in an amount of 100 parts by wt.

Component A2

Component A2) comprises polyether polyols having a hydroxyl number as per DIN 53240 of ≥20 mg KOH/g to ≤250 mg KOH/g, preferably of ≥20 to ≤112 mg KOH/g and particularly preferably ≥20 mg KOH/g to ≤80 mg KOH/g and is free from carbonate units. The production of the compounds according to A2) may be effected by catalytic addition of one or more alkylene oxides onto H-functional starter compounds.

Alkylene oxides (epoxides) that may be used are alkylene oxides having 2 to 24 carbon atoms. The alkylene oxides having 2 to 24 carbon atoms are for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Alkylene oxides employed are preferably ethylene oxide and/or propylene oxide and/or 1,2-butylene oxide. Particular preference is given to using an excess of propylene oxide and/or 1,2-butylene oxide. The alkylene oxides may be supplied to the reaction mixture individually, in admixture or successively. The copolymers may be random or block copolymers. When the alkylene oxides are metered in successively, the products (polyether polyols) produced comprise polyether chains having block structures.

The H-functional starter compounds have functionalities of ≥2 to ≤6 and are preferably hydroxy-functional (OH-functional). Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-dial, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. The starter compound employed is preferably 1,2-propylene glycol and/or glycerol and/or trimethylolpropane and/or sorbitol.

The polyether polyols according to A2) preferably have a content of ≥0 to ≤40 wt %, particularly preferably ≥0 to ≤25 wt % of ethylene oxide.

Component A3

Employed as component A3 are 0.5 to 25 parts by wt, preferably 1.0 to 15 parts by wt, particularly preferably 1.5 to 10 parts by wt (based on the sum of the parts by wt of components A1 and A2) of water and/or physical blowing agents. Physical blowing agents employed as blowing agents are for example carbon dioxide and/or volatile organic substances. It is preferable when water is employed as component A3.

Component A4

Antioxidants that may be employed in the production of flexible polyurethane foams are known per se to those skilled in the art. Such compounds are described for example in EP-A 1874853, G. Oertel (editor): "Kunststoff-Handbuch", volume VII, Carl-Hanser-Verlag, Munich, Vienna 1993, Chapter 3.4.8 or in Ullmanns's Encyclopedia of Industrial Chemistry Peter P. Klemchuck, 2012, Vol. 4, p. 162 ff, Wiley VCH-Verlag. According to the invention component A4 comprises an antioxidant A4.1 free from compounds having amino groups and an antioxidant A4.2 comprising at least one compound having one or more amino groups, used.

Antioxidants A4.1 free from amino groups comprise compounds comprising
i) phenol derivatives
ii) lactones, in particular benzofuran-2-one derivatives
iii) phosphorus derivatives
and any desired mixtures of these compounds.

Compounds comprising phenol derivatives i) are for example 2,6-di-(t-butyl)-p-cresol (BHT), tetrakis[methylene (3,5-di-t-butyl-4-hydroxyhydrocinnamate)]methane, 2,2'-methylenebis-(4-methyl-6-t-butylphenol), 2,6-di-t-butyl-4-methylphenol, N,N'-1,6-hexamethylene-bis-3-(3,5-di-t-butyl-4-hydroxyphenyl)propionamide, alkyl-3-(3,5-di-t-butyl-4-hydroxyphenylpropionate), wherein alkyl comprehends a C1 to C24, preferably C1 to C20, particularly preferably C1 to C18 carbon radical, ethylene-(bisoxyethylene)bis-(3,(5-t-butylhydroxy-4-tolyl)-propionate 4,4'-butylidenebis-(6-t-butyl-3-methylphenol) and/or tocopherols, for example α-tocopherol, β-tocopherol, γ-tocopherol, δ-tocopherol and mixtures thereof (vitamin E), preference being given to 2,6-di-(t-butyl)-p-cresol (BHT), tetrakis[methylene(3,5-di-t-butyl-4-hydroxyhydrocinnamate)]methane, alkyl-3-(3,5-di-t-butyl-4-hydroxyphenyl-propionate), wherein alkyl comprehends a C1 to C24, preferably C1 to C20, particularly preferably C1 to C18 carbon radical, octadecyl-3-(3,5-di-t-butyl-4-hydroxyphenylpropionate), α-tocopherol, β-tocopherol, γ-tocopherol and/or δ-tocopherol.

Amine-free lactones ii), in particular benzofuranones, are described for example in EP-A 1291384 and DE-A 19618786. Preferred benzofuranones are for example 5,7-di-t-butyl-3-phenyl-benzofuran-2-one, 5,7-di-t-butyl-3-(3,4-dimethylphenyl)-benzofuran-2-one, 5,7-di-t-butyl-3-(2,3-dimethylphenyl)-benzofuran-2-oneand/or 5-t-octyl-3-(2-acetyl-5-t-octylphenyl)-benzofuran-2-one.

Antioxidants iii) are for example phosphites and phosphonites. These are described for example in EP-A 905180 and EP-A 1874853, for example triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-t-butylphenyl) phosphite, diisodecyl pentaerythritol diphosphite, bis (2,4-di-t-butylphenyl) pentaerythritol diphosphite, bis(2,6-di-t-butyl-4-methylphenyl) pentaerythritol diphosphite, bisisodecyloxy pentaerythritol diphosphite, bis(2,4-di-t-butyl-6-methylphenyl) pentaerythritol diphosphite, bis(2,4,6-tri-t-butylphenyl) pentaerythritol diphosphite, tristearyl sorbitol triphosphite, tetrakis(2,4-di-t-butylphenyl) 4,4'-biphenylene diphosphonite, 6-isooctyloxy-2,4,8,10-tetra-t-butyl-12H-dibenzo[d,g]-1,3,2-dioxaphosphocine, 6-fluoro-2,4,8,10-tetra-t-butyl-12-methyldibenzo[d,g]-1,3,2-dioxaphosphocine, bis(2,4-di-t-butyl-6-methylphenyl) methyl phosphite and/or bis(2,4-di-t-butyl-6-methylphenyl) ethyl phosphite.

Antioxidants A4.2 comprising at least one compound having one or more amino groups are generally secondary amines of formula

HNR1R2 (VI), where R1 represents C1-C18 alkyl, phenyl-C1-C4-alkyl, C5-C12-cycloalkyl, phenyl, naphthyl, phenyl or naphthyl, each of which is substituted by C1-C12 alkyl or C1-C12 alkoxy or benzyl or α,α-dimethylbenzyl and
R2 represents phenyl, naphthyl, phenyl or naphthyl, each of which is substituted by C1-C12 alkyl or C1-C12 alkoxy or benzyl or α,α-dimethylbenzyl.

Suitable antioxidants A4.2 are for example N,N'-di-isopropyl-p-phenylenediamine, N,N'-di-sec-butyl-p-phenylenediamine, N,N'-bis(1,4-dimethyloentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4- t-octylphenyl)-1-naphthylamine, N-phenyl-2-naphthylamine, octylated diphenylamine, for example p,p'-di-t-octyldiphenylamine, 4-n-butylaminophenol, 4-butyrylarninophenol, 4-nonanoylaminophenol, 4-dodecanoylaminophenol, 4-octadecanoylaminophenol, bis(4-methoxyphenyl)amine, 2,6-di-t-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl)phenyl]amine, t-octylated N-phenyl-1-naphthylamine, a mixture of mono- and dialkylated t-butyl/t-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated t-butyldiphenylamines, 2,3-dihydro-3,3-dimethyl-4H-1,4-benzothiazine, phenothiazine, a mixture of mono- and dialkylated t-butyl/t-octylphenothiazines, a mixture of mono- and dialkylated t-octyl-phenothiazines, N-allylphenothiazine and/or N,N,N',N'-tetraphenyl-1,4-diaminobut-2-ene, preference being given to a mixture of mono- and dialkylated t-butyl/t-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated t-butyldiphenylamines.

In one embodiment the antioxidant A4.1 free from amino groups comprises compounds comprising
i) phenol derivatives
ii) lactones
iii) phosphorus derivatives
and any desired mixtures of these compounds and the antioxidant A4.2 comprises at least one compound having one or more secondary amino groups.

In a further embodiment antioxidant A4.1 comprises at least one phenol derivative i) and antioxidant A4.2 comprises at least one compound of formula

HNR1R2 (VI)

where R1 represents C1-C18 alkyl, phenyl-C1-C4-alkyl, C5-C12-cycloalkyl, phenyl, naphthyl, phenyl or naphthyl, each of which is substituted by C1-C12 alkyl or C1-C12 alkoxy or benzyl or α,α-dimethylbenzyl and
R2 represents phenyl, naphthyl, phenyl or naphthyl, each of which is substituted by C1-C12 alkyl or C1-C12 alkoxy or benzyl or α,α-dimethylbenzyl.

In a further embodiment antioxidant A4.1 is employed in an amount of 0.02-3.0 parts by wt, preferably 0.04-2.0 parts by wt, particularly preferably 0.05 1.5 parts by wt, based on the sum of the parts by wt of components A1 and A2 and antioxidant A4.2 is employed in amount of 0.02-3.0 parts by wt, preferably 0.04-2.0 parts by wt, particularly preferably 0.05-1.5 parts by wt, based on the sum of the parts by wt of components A1 and A2.

In a further embodiment the process according to the invention is effected in the presence of
A4.1 0.02-3.0 parts by wt, preferably 0.04-2.0 parts by wt, particularly preferably 0.05-1.5 parts by wt, based on the sum of the parts by wt of components A1 and A2 of at least one compound selected from the group consisting of 2,6-di-(t-butyl)-p-cresol (BHT), tetrakis [methylene(3,5-di-t-butyl-4-hydroxyhydrocinnamate)] methane, 2,2'-methylenebis-(4-methyl-6-t-butylphenol), 2,6-di-t-butyl-4-methylphenol, N,N'-1,6-hexamethylene-bis-3-(3,5-di-t-butyl-4-hydroxyphenyl) propionamide, alkyl-3-(3,5-di-t-butyl-4-4-hydroxyphenylpropionate), wherein alkyl comprehends a C1 to C24, preferably C1 to C20, particularly preferably C1 to C18 carbon radical, ethylene-(bisoxyethylene)bis-(3,(5-t-butylhydroxy-4-tolyl)-propionate 4,4'-butylidenebis-(6-t-butyl-3-methylphenol) and/or tocopherols, for example α-tocopherol, β-tocopherol, γ-tocopherol, δ-tocopherol and mixtures thereof (vitamin E),
and
A4.2 0.02-3.0 parts by wt, preferably 0.04-2.0 parts by wt, particularly preferably 0.05-1.5 parts by wt, based on the sum of the parts by wt of components A1 and A2 of at least one compound selected from the group consisting of N,N'-di-isopropyl-p-phenylenediamine, N,N'-di-sec-butyl-p-phenylenediamine, N,N'-bis(1,4-dimethyloentyl)-p-phenylenediamine, N,N'-bis(ethyl-3-methylpentyl)-p-phenylenediamine, N,N'-bis(1-methylheptyl)-p-phenylenediamine, N,N'-dicyclohexyl-p-phenylenediatnine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-t-octylphenyl)-1-naphthylamine, N-phenyl-2-naphthylamine, octylated diphenylamine, for example p,p'-di-t-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-t-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, t-octylated N-phenyl-1-naphthylamine, a mixture of mono- and dialkylated t-butyl/t-octyldiphenylamines, a mixture of mono- und dialkylated nonyldiphenylamines, a mixture of mono- and dialkylated dodecyldiphenylamines, a mixture of mono- and dialkylated isopropyl/isohexyldiphenylamines, a mixture of mono- and dialkylated t-butyldiphenylamines, 2,3-dihydro-3,3-dimethyl-4H-1,4-benzothiazine, phenothiazine, a mixture of mono- and dialkylated t-butyl/t-octylphenothiazines, a mixture of mono- and dialkylated t-octyl-phenothiazines, N-allylphenothiazine and/or N,N,N',N'-tetraphenyl-1,4-diaminobut-2-ene.

In a further embodiment the process according to the invention is effected in the presence of
A4.1 0.02-3.0 parts by wt, preferably 0.04-2.0 parts by wt, particularly preferably 0.05-1.5 parts by wt, based on the sum of the parts by wt of components A1 and A2, at least one compound selected from the group consisting of 2,6-di-(t-butyl)-p-cresol (BHT), tetrakis[methylene(3,5-di-t-butyl-4-hydroxyhydrocinnamate)]methane, alkyl-3-(3,5-di-t-butyl-4-hydroxyphenylpropionate), wherein alkyl comprehends a C1 to C18 carbon radical, octadecyl-3-(3,5-di-t-butyl-4-hydroxyphenylpropionate), α-tocopherol, β-tocopherol, γ-tocopherol and/or δ-tocopherol,
and
A4.2 0.02-3.0 parts by wt, preferably 0.04-2.0 parts by wt, particularly preferably 0.05-1.5 parts by wt, based on the sum of the parts by wt of components A1 and A2 of at least one compound selected from the group consisting of mono- and dialkylated t-butyl/tert-octyldiphenylamines, a mixture of mono- und dialkylated nonyldiphenylamines, a mixture of mono- and dialkylated dodecyldiphenylamines, a mixture of mono- and dialkylated isopropyl/isohexyldiphenylamines, a mixture of mono- and dialkylated t-butyldiphenylamines.

Component A5
Employed as component A5 are 0.1 to 8.1 parts by wt, preferably 0.1 to 7.5 parts by wt, particularly preferably 0.15 to 7.0 parts by wt, based on the sum of the parts by wt of components A1 and A2 of auxiliary and added substances such as
a) catalysts,
b) surface-active added substances, such as emulsifiers and foam stabilizers, in particular those having low emissions, for example products of the Tegostab® LF series,
c) additives such as reaction retardants (for example acidic substances such as hydrochloric acid or organic acyl halides), cell regulators (for example paraffins or fatty alcohols or dimethylpolysiloxanes), pigments, dyes, flame retardants (for example tricresyl phosphate or ammonium polyphosphate), further stabilizers against aging and weathering effects, plasticizers, fungistatic and bacteriostatic substances, fillers (for example barium sulfate, kieselguhr, carbon black or whiting) and release agents.

These auxiliary and added substances for optional use are described for example in EP-A 0 000 389, pages 18-21. Further examples of auxiliary and added substances for optional use according to the invention and also details concerning ways these auxiliary and added substances are used and function are described in Kunststoff-Handbuch, volume VII, edited by G. Oertel, Carl-Hanser-Verlag, Munich, 3rd edition, 1993, for example on pages 104-127.

Preferably employed catalysts are aliphatic tertiary amines (for example trimethylamine, triethylamine, tetramethylbutanediamine), cycloaliphatic tertiary amines (for example 1,4-diaza[2.2.2]bicyclooctane), aliphatic amino ethers (for example dimethylaminoethyl ether and N,N,N-trimethyl-N-hydroxyethylbisaminoethyl ether), cycloaliphatic amino ethers (for example N-ethylmorpholine), aliphatic amidines, cycloaliphatic amidines, urea, derivatives of urea (for example aminoalkylureas; see, for example, EP-A 0 176 013, especially (3-dimethylaminopropylamino)urea), and tin catalysts (fur example dibutyltin oxide, dibutyltin dilaurate, tin(II) ethylhexanoate, tin ricinoleate).

Component B

Suitable di- and/or polyisocyanates are aliphatic, cycloaliphatic, araliphatic, aromatic and heterocyclic polyisocyanates, as described, for example, by W. Siefken in Justus Liebigs Annalen der Chemie, 562, pages 75 to 136, for example those of the formula (III)

Q(NCO)$_n$, (VII)

in which
n=2-4, preferably 2-3, and
Q is an aliphatic hydrocarbon radical having 2-18 and preferably 6-10 carbon atoms, a cycloaliphatic hydrocarbon radical having 4-15 and preferably 6-13 carbon atoms or an araliphatic hydrocarbon radical having 8-15 and preferably 8-13 carbon atoms.

The polyisocyanates are for example those described in EP-A 0 007 502, pages 7-8. Preference is generally given to the readily industrially obtainable polyisocyanates, for example tolylene 2,4- and 2,6-diisocyanate and any desired mixtures of these isomers ("TDI"); polyphenylpolymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which derive from tolylene 2,4- and/or 2,6-diisocyanate or from diphenylmethane 4,4'- and/or 2,4'-diisocyanate. The polyisocyanate is employed preferably a compound selected from the group consisting of 2,4- and 2,6-tolylene diisocyanate, 4,4'- and 2,4'- and 2,2'-diphenylmethane diisocyanate and/or polyphenyl polymethylene polyisocyanate ("polycyclic MDI").

In a further embodiment of the process according to the invention the isocyanate component B comprises a tolylene diisocyanate isomer mixture composed of 55 to 90 wt % of 2,4-TDI and 10 to 45 wt % of 2,6-TDI.

In a further embodiment of the process according to the invention the index is ≥70 to ≤130, preferably ≥85 to ≤125, particularly preferably ≥90 to ≤120. The index indicates the percentage ratio of the actually employed isocyanate amount to the stoichiometric, i.e. calculated for the conversion of the OH equivalents, amount of isocyanate groups (NCO) amount.

Index=(isocyanate amount employed):(isocyanate amount calculated)·100 (VIII)

The polyurethane foams, preferably flexible polyurethane foams, obtainable according to the invention find application for example in: furniture cushioning, textile inserts, mattresses, automotive seats, headrests, armrests, sponges, foam sheetings for use in automotive components, for example roof headlinings, door trim, seat covers and constructional elements.

EXAMPLES

Polyol A1-1: trifunctional polyether carbonate polyol based on glycerol having a hydroxyl number of 50 mg KOH/g and obtained by copolymerization of 15 wt % of carbon dioxide with 85 wt % of propylene oxide. e/f ratio=1:3.8

Polyol A2-1: trifunctional polyether polyol based on glycerol having a hydroxyl number of 56 mg KOH/g and obtained by copolymerization of 13 wt % of ethylene oxide with 87 wt % of propylene oxide.

A5-1 (stabilizer): siloxane-based foam stabilizer, Tegostab® BF 2370 (Evonik Goldschmidt GmbH, Essen)

Antioxidant A4.1-1 (phenolic): 3-(3,5-di-t-butyl-4-hydroxyphenyl)propionio acid octadecyl ester, obtainable under the name Irganox® 1076 (BASF SE, Ludwigshafen)

Antioxidant A4.1-2 (amine-free): Irgastab® PUR 68 (BASF SE, Ludwigshafen), safety data sheet states a mixture of
a) a phenolic antioxidant, namely 3-(3,5-di-t-butyl-4-hydroxyphenyl)propionic acid esters of aliphatic, branched alcohols having 7-9 carbon atoms
b) a phosphorus derivative, namely bis[2,4-bis(1,1-dimethylethyl)-6-methylphenylphosphoric acid ethyl ester
c) a lactone, namely 3-[2-[acetyloxy)-5-(1,1,3,3-tetramethylbutyl]-phenyl]-5-(1,1,3,3-tetramethylbutyl)-(9CI)-2(3H)-benzofuranone, Antioxidant A4.2-1 (aminic): octylated diphenylamine, obtainable under the name Irganox® 5057 (BASF SE, Ludwigshafen)

Isocyanate B-1: mixture of 80 wt % of tolylene 2,4- and 20 wt % of tolylene 2,6-diisocyanate, available under the name Desmodur® T 80 (Bayer MaterialScience AG, Leverkusen)

A5-2 (catalyst): bis(2-dimethylaminoethyl) ether in dipropylene glycol, obtainable under the name Addocat® 108 (Rheinchemie Rheinau GmbH, Mannheim)

A5-3 (catalyst): tin(II) ethylhexanoate, obtainable under the name Dabco® T-9, (Air Products GmbH, Hamburg)

The hydroxyl number was determined as per DIN 53240.

The $CO_2$ content, the hydroxyl number and the starter employed were used to calculate the elf ratio (see formula (IX)) for the polyether carbonate polyol Al.

Polyurethane foams were produced according to the formulations specified in the table below. Immediately after the foaming procedure the foam specimens were irradiated for 15 minutes with 1.70 W of microwave radiation in a microwave oven (Panasonic, NE-1440) and then stored for 15 minutes at 130° C. in a forced air drying cabinet. After cooling the foam specimens were longitudinally dissected down the middle and oxidative degradation was measured with reference to the discoloration of the foam core by determining the yellowness index with the aid of a colorimeter (Dr. Lange). A low yellowness index indicates low discoloration and thus also low oxidative degradation.

The proportions of the components axe listed in parts by weight. Example 1 is an inventive example, while examples 2 to 7 are comparative examples. Examples 5-7 (comparative) employed a polyether polyol comprising no polycarbonate units.

TABLE 1

Flexible polyurethane foams

| Example | 1 | 2 | 3 (comp.) | 4 (comp.) | 5 (comp.) | 6 (comp.) | 7 (comp.) | 8 (comp.) |
|---|---|---|---|---|---|---|---|---|
| A1-1 | 100 | 100 | 100 | 100 | 100 | | | |
| A2-1 | | | | | | 100 | 100 | 100 |
| A4.1-1 | 0.20 | | | 0.40 | | 0.20 | | 0.40 |
| A4.1-2 | | 0.2 | 0.40 | | | | 0.40 | |
| A4.2-1 | 0.20 | 0.2 | | | | 0.20 | | |
| A5-1 | 1.50 | 1.5 | 1.50 | 1.50 | 1.50 | 1.50 | 1.50 | 1.50 |
| A5-2 | 0.10 | 0.10 | 0.10 | 0.10 | 0.10 | 0.10 | 0.10 | 0.10 |
| A5-3 | 0.15 | 0.15 | 0.15 | 0.15 | 0.15 | 0.15 | 0.15 | 0.15 |
| water A3 | 6.0 | 6.0 | 6.0 | 6.0 | 6.0 | 6.0 | 6.0 | 6.0 |
| isocyanate B-1 | 71.0 | 71.0 | 71.0 | 71.0 | 71.0 | 72.0 | 72.0 | 72.0 |
| NCO index | 108 | 108 | 108 | 108 | 108 | 108 | 108 | 108 |
| Yellowness Index (discoloration in the interior of the foam) | 64.8 | 21.2 | 94.3 | 70.9 | 75.3 | 43.5 | 3.4 | 48 |

The results show that better protection against oxidative degradation is observed for the inventive stabilization in examples 1 and 2 than for the stabilizations used in the comparative examples 3 and 4/without stabilization in example 5.

The comparative examples 6 to 8 were produced with a conventional polyol. These examples show that the antioxidant does not affect discoloration in the interior of the foam in the same way as in the case of flexible polyurethane foams produced with polyether carbonate polyols.

The invention claimed is:
1. A process for producing polyurethane foams, comprising reacting a component A comprising
≥50 to ≤100 parts by wt of a polyether carbonate polyol A1 having a hydroxyl number according to DIN 53240 of ≥20 mg KOH/g to ≤250 mg KOH/g, wherein the polyether carbonate polyol A1 comprises blocks according to formula (IX) with an e/f ratio of 2: 1 to 1:20.

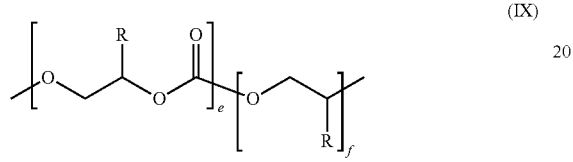

wherein each R represents an organic alkyl, alkylaryl or aryl radical, optionally containing heteroatoms selected from the group consisting of O, S, and Si,
≤50 to ≥0 parts by wt of a polyether polyol A2 having a hydroxyl number according to DIN 53240 of ≥20 mg KOH/g to ≤250 mg KOH/g, wherein the polyether polyol is free from carbonate units,
0.5 to 25 parts by wt based on the sum of the parts by wt of components A1 and A2 of a component A3 which is water and/or physical blowing agents,
0.02 - 3.0 parts by wt based on the sum of the parts by wt of components A1 and A2 of an antioxidant A4.1 which is free of amino groups, and
0.02 - 3.0 parts by wt based on the sum of the parts by wt of components A1 and A2 of an antioxidant A4.2 which comprises at least one compound having one or more amino groups,
0.1 to 8.1 parts by wt based on the sum of the parts by wt of components A1 and A2 of auxiliary and added substances A5,
with a component B comprising di- and/or polyisocyanate,
wherein said producing polyurethane foams occurs at an isocyanate index of 70 to 130 and
wherein the sum of the parts by weight A1+A2 in the composition amounts to 100.

2. The process as claimed in claim 1, wherein 100 parts by wt of polyether carbonate polyol A1 are employed.

3. The process as claimed in claim 1, wherein the antioxidant A 4.1 comprises compounds comprising
i) phenol derivatives
ii) lactones
iii) phosphorus derivatives
and/or mixtures thereof and
antioxidant A4.2 comprises at least one compound having one or more secondary amino groups.

4. The process as claimed in claim 1, wherein
antioxidant A4.1 comprises at least one phenol derivative i) and
antioxidant A4.2 comprises at least one compound of formula

HNR1R2 (VI)

where R1 and R2 each independently represent phenyl or naphthyl, each of which is substituted by C1-C12 alkyl or C1-C12 alkoxy or benzyl or α,α-dimethylbenzyl.

5. The process as claimed in claim 1, wherein
antioxidant A4.1 comprises at least
one compound selected from the group consisting of 2,6-di-(t-butyl)-p-cresol (BHT), tetrakis[methylene (3,5-di-t-butyl-4-hydroxyhydrocinnamate)]methane, 2,2'-methylenebis-(4-methyl-6-t-butylphenol), 2,6-di-t-butyl-4-methylphenol, N,N'-1,6-hexamethylene-bis-3-(3,5-di-t-butyl-4-hydroxyphenyl)propionamide, alkyl-3-(3,5-di-t-butyl-4-hydroxyphenyl) propionate wherein alkyl is a C1 to C24 carbon radical, ethylene-(bisoxyethylene)bis-(3,(5-t-butyl-hydroxy-4-tolyl)-propionate 4,4'-butylidenebis-(6-t-butyl-3-methylphenol), and tocopherols and
antioxidant A4.2 comprises at least
one compound selected from the group consisting of N,N'-di-isopropyl-p-phenylenediamine, N,N'-di-sec-butyl-p-phenylenediamine, N,N'-bis(1,4-dimethylpentyl)-p-phenylenediamine,N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di -sec-butyl-p-phenylenediamine, diphenylamine, N-allyldiphenylamine, 4-isopropoxydiphenylamine, N-phenyl-1-naphthylamine, N-(4-t-octylphenyl)-1-naphthylamine, N-phenyl-2-naphthylamine, octylated diphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-t-butyl-4-dimethylaminomethylphenol, 2,4'-diaminodiphenylmethane, 4,4'-diaminodiphenylmethane, N,N,N', N'-tetramethyl-4,4'-diaminodiphenylmethane, 1,2-bis[(2-methylphenyl)amino]ethane, 1,2-bis (phenylamino)propane, (o-tolyl)biguanide, bis[4-(1', 3'-dimethylbutyl)phenyl ]amine, t-octylated N-phenyl- 1 -naphthylamine, a mixture comprising mono- and dialkylated t-butyldiphenylamine and t -octyldiphenylamine compounds, a mixture of mono- and dialkylated nonyldiphenylamines, a mixture of mono- and dialkylated dodecyldiphenylamines, a mixture comprising mono- and dialkylated isopropylamine and isohexyldiphenylamine compounds, a mixture of mono- and dialkylated t-butyldiphenylamines, 2,3-dihydro-3,3-dimethyl-4H-1,4-benzothiazine, phenothiazine, a mixture comprising mono- and dialkylated t-butylphenothiazine and t-octylphenothiazine compounds, a mixture of mono- and dialkylated t-octyl-phenothiazines, N-allylphenothiazine and N,N,N',N'-tetraphenyl-1,4-diaminobut-2-ene.

6. The process as claimed in claim 1, wherein
antioxidant A4.1 comprises at least
one compound selected from the group consisting of 2,6-di-(t-butyl)-p-cresol (BHT), tetrakis[methylene (3,5-di-t-butyl-4-hydroxyhydrocinnamate )]methane, alkyl-3-(3,5-di-t-butyl-4-hydroxypheny ppropionate wherein alkyl corresponds to a C1 to C18 carbon radical, octadecyl-3-(3,5-di-t-butyl-4-hydroxyphenylpropionate), α-tocopherol, β-tocopherol, γ-tocopherol and δ-tocopherol; and
antioxidant A4.2 comprises at least
one compound selected from the group consisting of a mixture comprising mono-and dialkylated t-butyldiphenylamine and tert-octyldiphenylamine compounds, a mixture of mono- and dialkylated nonyldiphenylamines, a mixture of mono- and dialkylated dodecyldiphenylamines, a mixture comprising mono- and dialkylated isopropyldiphenylamine and isohexyldiphenylamine compounds, and a mixture of mono- and dialkylated t-butyldiphenylamines.

7. The process as claimed in claim 1, wherein antioxidants A4.1 and A4.2 are each present in an amount of 0.05 - 1.5 parts by wt based on the sum of the parts by weight of components A1 and A2.

8. The process as claimed in claim 1, wherein the polyether
carbonate polyol A1 is obtained by copolymerization of ≥2 wt% to ≤30 wt% of carbon dioxide and ≥70 wt% to ≤98 wt% of one or more alkylene oxides,
wherein the amounts of carbon dioxide and alkylene oxide are set forth in weight percentages relative to the total combined weight of carbon dioxide and alkylene oxide,
in the presence of one or more H-functional starter molecules having an average functionality of ≥1 to ≤6.

9. The process as claimed in claim 1, wherein the polyether carbonate polyol A1 is obtained using multi-metal cyanide catalysts (DMC catalysts).

10. The process as claimed in claim 1, wherein the polyether carbonate polyol A1 is obtained using ethylene oxide and/or propylene oxide.

11. The process as claimed in claim 1, wherein the polyether carbonate polyol A1 is obtained using propylene oxide.

12. The process as claimed in claim 1, wherein component B comprises tolylene 2,4-diisocyanate, tolylene 2,6-diisocyanate, diphenylmethane 4,4'-diisocyanate, diphenylmethane 2,4'-diisocyanate, diphenylmethane 2,2'-diisocyanate and/or polyphenyl polymethylene polyisocyanate.

13. A flexible polyurethane foam obtained by a process as claimed in claim 1.

14. An article comprising the flexible polyurethane foam as claimed in claim 13 wherein the article is a furniture cushioning, a textile insert, a mattress, an automotive seat, a headrest, an armrest, a sponge, a foam sheeting, or a constructional element.

* * * * *